(12) United States Patent
Graham et al.

(10) Patent No.: US 9,769,209 B1
(45) Date of Patent: Sep. 19, 2017

(54) IDENTITY SECURITY AND CONTAINMENT BASED ON DETECTED THREAT EVENTS

(71) Applicant: SecureAuth Corporation, Irvine, CA (US)

(72) Inventors: Keith Martin Graham, Ashburn, VA (US); Stephen Garnett Cox, Leesburg, VA (US)

(73) Assignee: SecureAuth Corporation, Irvine, CA (US)

( * ) Notice: Subject to any disclaimer, the term of this patent is extended or adjusted under 35 U.S.C. 154(b) by 0 days.

(21) Appl. No.: 15/061,846

(22) Filed: Mar. 4, 2016

(51) Int. Cl.
*H04L 9/00* (2006.01)
*H04L 29/06* (2006.01)

(52) U.S. Cl.
CPC .............. *H04L 63/20* (2013.01); *H04L 63/10* (2013.01); *H04L 63/1416* (2013.01); *H04L 63/1433* (2013.01)

(58) Field of Classification Search
CPC ... H04L 63/1483; G06F 21/577; G06F 21/55; G06F 21/56
USPC .......................................... 726/1, 22–23, 28
See application file for complete search history.

(56) References Cited

U.S. PATENT DOCUMENTS

| | | |
|---|---|---|
| 8,695,097 B1 | 4/2014 | Mathes et al. |
| 2007/0006305 A1* | 1/2007 | Florencio ................ H04L 63/14 726/22 |
| 2013/0254857 A1* | 9/2013 | Bajenov ................... G06F 21/00 726/7 |
| 2016/0055350 A1 | 2/2016 | Gottschalk, Jr. et al. |

FOREIGN PATENT DOCUMENTS

| | | |
|---|---|---|
| KR | 10-0324248 | 2/2002 |
| KR | 10-2006-0040155 | 5/2006 |
| KR | 10-2015-0143394 | 12/2015 |

OTHER PUBLICATIONS

International Search Report and Written Opinion for International Application No. PCT/US2017/020487, Notification dated May 31, 2017.

* cited by examiner

*Primary Examiner* — Alexander Lagor
(74) *Attorney, Agent, or Firm* — Knobbe Martens Olson & Bear LLP (57) ABSTRACT

An alert source issues security alerts to an identity provider, which acts as a gatekeeper to a secure resource. Each security alert is associated with an alert user identity and a security threat. When a user identity requests access to the secure resource, the identity provider may look up security alerts associated with the user identity, such as my matching up the user identity with the alert user identity associated with each alert. Based on any discovered security alerts that correspond to the user identity and a pre-defined security policy, the identity provider may perform various security actions on the user identity. For example, the identity provider may contain a user identity associated with high-risk and/or high fidelity security alerts. The identity provider may deny the user identity access to the secure resource, or the identity provider may request additional authentication factors associated with the user identity before access to the secure resource is provided. The identity provider may provide access to the secure resource without containing the user identity if there are no discovered security alerts associated with the user identity, or if the discovered security alerts pose a minor threat.

20 Claims, 6 Drawing Sheets

IDENTITY SECURITY AND CONTAINMENT BASED ON DETECTED THREAT EVENTS

BACKGROUND

Users may seek to use electronic devices such as desktop computers, smartphones, tablets, and notebooks in order to access a secure resource or application over a network. For example, a user may direct a browser on a desktop computer to access a secure website through the internet. The user may be associated with an user identity, and the electronic device being used may be referred to as an endpoint device. Access to the secure resource, application, or website that contains the user-desired content may be controlled by a computing device, service, or application.

In order to reduce security vulnerabilities, access to the secure resource should be provided only if the user identity is properly validated and not compromised by security threats. Instead, if the user identity is detected to have been comprised by security threats, access to the secure resource should not be freely provided.

SUMMARY

A user of an endpoint device, such as a computer terminal or a mobile device may seek to obtain access to a secure resource, such as a secure website, through their user identity. The user may not be aware that their endpoint device has been compromised or infected with malware. Or the user identity may have been stolen, such as through a phishing attack, so that a different, malicious user is using the user identity in an attempt to access the secure resource. Thus, there is a need to provide real-time containment of a user identity, rather than the device that is being used to request access to a secure resource (since a malicious user can just use a stolen user identity on a different device).

Containing user identities is a high fidelity approach that allows protection against malicious activity that is very context-specific (e.g., an incident that is happening right now, or has just happened). One way of doing this is to have an alert source, such as a threat detection device or a malware detection feed, monitor user identities for any associated security threats. The alert source may be a third-party threat detection product. For example, the alert source may monitor a user being targeted with phishing emails. If the user clicks on the phishing link, the user identity is considered compromised and the alert source may issue an alert.

An identity provider may receive and consume that security event/alert along with the threat data. The identity provider may then control the identity according to what level of risk the organization controlling the secure resource is willing to tolerate, based on the original security event/alert. In the case of a major security risk associated with a high fidelity alert/event, the organization may choose to enforce a security policy that elevates the security level of all user identities needed to authenticate (such as by requiring an additional one-time password and a biometric over the standard username and password). The identity provider may also be able to put a quarantine or container on an individual user identity, by disabling the user account or forcing the user to provide a second factor of authentication. Thus, embodiments of this disclosure relate to systems and methods capable of receiving alerts, evaluating alerts, and enforcing a security policy on user identities based on the alerts.

The systems and methods described herein each have several aspects, no single one of which is solely responsible for its desirable attributes. Without limiting the scope of this disclosure, several non-limiting features will now be discussed briefly.

Note, although the system may comprise a prebuilt appliance or server with hardware processors, the system may also, in some embodiments, comprise a virtual appliance (such as a VMWare image that can be used to emulate an appliance on any standard computing system that supports virtual images). For more information and background on other configurations, features, functions, and options of the appliance and/or client devices, see U.S. Pat. Nos. 8,327,142, 8,301,877, 8,707,031, 8,613,067, 8,510,816, 8,769,651, and U.S. Provisional Patent Application 61/941,286, filed Feb. 18, 2014, each of which are incorporated herein by reference in their entirety for all purposes.

According to some embodiments, a computing appliance is disclosed for consuming security alerts from an alert source. The system may comprise one or more processors, a computer-readable memory, and an authentication program comprising executable instructions stored in the computer-readable memory. The executable instructions may direct the one or more processors to at least: receive a security alert from an alert source over a computer network, wherein the security alert is associated with a security threat and an alert user identity; derive the alert user identity from the security alert; determine a security action based on the security alert and a security protocol; receive, over the computer network, a request to access a secure resource, wherein the request is associated with a user identity; match the user identity to the alert user identity to identify the determined security action associated with the alert user identity; and enforce the determined security action for the user identity.

In some embodiments, to determine a security action, the executable instructions further direct the one or more processors to classify the security alert in to an action category defined in the security protocol, which has at least two action categories. In some embodiments, the at least two action categories in the security protocol comprise: a deny access category for which the security action comprises denying the user identity access to the secure resource; and a step-up security category for which the security action comprises requesting at least one additional security factor from the user identity. In some embodiments, the at least one additional security factor comprises at least one of: a username, a password, a one-time password, or a biometric. In some embodiments, the executable instructions further direct the one or more processors to provide the user identity access to the secure resource if the user identity is unable to be matched to the alert user identity. In some embodiments, the alert source is a malware detection feed.

According to some embodiments, a computerized method is disclosed for providing a derived credential to a target device. The method comprising, by one or more hardware processors executing computing instructions, receiving a security alert from an alert source over a computer network, wherein the security alert is associated with a security threat and an alert user identity; deriving the alert user identity from the security alert; determining a security action based on the security alert and a security protocol; receiving, over the computer network, a request to access a secure resource, wherein the request is associated with a user identity; matching the user identity to the alert user identity to obtain the security alert associated with the alert user identity; and enforcing the determined security action for the user identity.

In some embodiments, determining a security action comprises classifying the security alert in to an action category defined in the security protocol, and wherein the security protocol comprises at least two action categories. In some embodiments, the at least two action categories in the security protocol comprise: a deny access category for which the security action comprises denying the user identity access to the secure resource; and a step-up security category for which the security action comprises requesting at least one additional security factor from the user identity. In some embodiments, the at least two action categories in the security protocol comprise: an allow access category for which the security action comprises providing the user identity access to the secure resource. In some embodiments, the at least one additional security factor comprises at least one of: a username, a password, a one-time password, or a biometric. In some embodiments, the method further comprises providing the user identity access to the secure resource if matching the user identity to the alert user identity is unsuccessful. In some embodiments, the alert source is a malware detection feed.

According to some embodiments, a computerized method is disclosed for issuing and consuming a security alert. The method comprising, by one or more hardware processors executing computing instructions, detecting a security threat, the security threat associated with a user identity; generating a security alert, the security alert associated with the security threat and the an alert user identity, and wherein the alert user identity is based upon the user identity; sending the security alert over a computer network; receiving the security alert over the computer network; deriving the alert user identity from the security alert; determining a security action based on the security alert and a security protocol; receiving, over the computer network, a request to access a secure resource, wherein the request is associated with the user identity; matching the user identity to the alert user identity to obtain the security alert associated with the alert user identity; and enforcing the determined security action for the user identity.

In some embodiments, detecting a security threat comprises monitoring malware on an endpoint device, and wherein the endpoint device comprises a computing device, a smart phone, a tablet, or a notebook computer. In some embodiments, determining a security action comprises classifying the security alert in to an action category defined in the security protocol, and wherein the security protocol comprises at least two action categories. In some embodiments, the at least two action categories in the security protocol comprise: a deny access category for which the security action comprises denying the user identity access to the secure resource; and a step-up security category for which the security action comprises requesting at least one additional security factor from the user identity. In some embodiments, the at least two action categories in the security protocol comprise: an allow access category for which the security action comprises providing the user identity access to the security resource. In some embodiments, the at least one additional security factor comprises at least one of: a username, a password, a one-time password, or a biometric. In some embodiments, the method further comprises providing the user identity access to the secure resource if matching the user identity to the alert user identity is unsuccessful.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION OF PREFERRED EMBODIMENTS

Although certain preferred embodiments and examples are disclosed below, the inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

To facilitate an understanding of the systems and methods discussed herein, a number of terms are defined below. The terms defined below, as well as other terms used herein, should be construed broadly to include, without limitation, the provided definitions, the ordinary and customary meanings of the terms, and/or any other implied meanings for the respective terms. Thus, the definitions below do not limit the meaning of these terms, but only provide example definitions.

Database or Data store: A broad term for any data structure for storing and/or organizing data, including, but not limited to, relational databases (for example, Oracle database, SQL database, mySQL database, and the like), an active directory/LDAP directory, spreadsheets, XML files, and text files, among others. The various terms "database," "data store," and "data source" may be used interchangeably in the present disclosure.

User Identity: This is a broad term used to refer to any identifier associated an unique, individual user. It may refer to a user account name or number, a security credential or certificate, or any other identifying information such as an email.

Secure Resource: This is a broad term for any computer-based resource that may require validation or authentication of a user identity or credential in order to be accessed. It may be a local, enterprise, or cloud resource (e.g., any web, network, mobile, or cloud resource).

Endpoint Device: A broad term for any electronic or computing device capable of accessing a secure resource. An endpoint device may include cell phones, smart phones, tablets, laptops, netbooks, chromebooks, and so forth.

Alert Source: A device, service, or application that generates and issues security alerts. The security alerts may be associated with a user identity that triggered the security alert. The alert source may be a threat detector/protector. The alert source may monitor a computer network or endpoint device to discover security threats and generate/issue security alerts based off of that. The alert source may be a malware detection feed, which may detect malware-infected devices and determine both the nature of the threat and the potential risk.

Identity Provider: A device, service, or application that receives security alerts. The identity provider may consume the security alerts in order to evaluate the security risk associated with each security alert, based on a security protocol. The identity provider may also identify the appropriate action to take for each security alert, based on the security protocol. The identity provider may act as a gatekeeper to a secure resource and receive requests from a user and/or a user identity to access the secure resource. The identity provider may look up the user identity in the security alerts in order to determine the appropriate action to enforce on the user identity.

Security Protocol: A pre-defined set of rules governing an identity provider. The security protocol may specify what action for the identity provider to take on a user identity that is seeking access to a secure resource. For example, the security protocol may be a set of pre-defined categories (e.g., high risk, medium risk, low risk) with an action tied to each category (e.g., deny access, step-up security, allow access). Upon receiving a request to access the secure resource, the identity provider may consult the security protocol and attempt to classify the user identity into one of the pre-defined categories in order to determine the appropriate action to take.

DESCRIPTION OF THE FIGURES

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure described above and/or below may include several novel features, no single one of which is solely responsible for its desirable attributes or which is essential to practicing the embodiments of the disclosure herein described.

I. Example Implementation Environment

Figure 1:
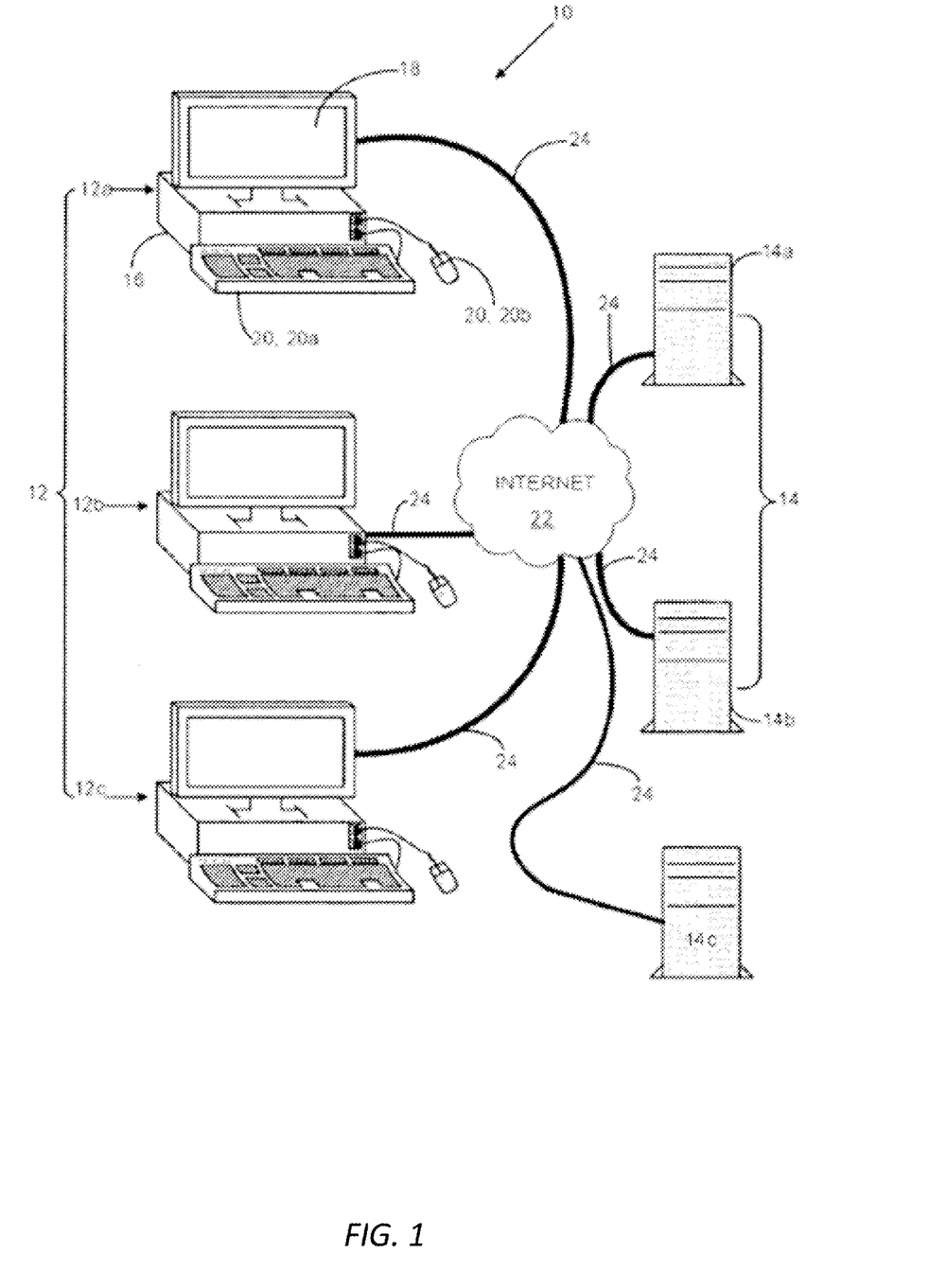
FIG. 1 is a block diagram illustrating an example environment in which one embodiment may be implemented, including various interconnected servers, clients, and networks.

With reference to FIG. 1, an exemplary computer network 10 includes various data processing apparatuses or computers 12, 14. More particularly, the computers 12 may be personal computers or workstations that function as client devices, and include a system unit 16 that houses a central processing unit, storage devices, and the like. The computers 12 may also include a display unit 18, and input devices 20 such as a keyboard 20*a* and a mouse 20*b*.

It is understood that the system unit 16 receives various inputs from the input devices 20 that alter the control and flow of preprogrammed instructions being executed by the central processing unit, and the results of such execution are shown on the display unit 18. In one embodiment of the present invention the client computers 12 also referred to as client devices 12 or computing devices 12, may also include, for example, a mobile phone or other portable electronic device, such as a tablet or notebook computer.

The computers 14 may be servers that provide data or services to the client computers 12. In this regard, the term "client" is understood to refer to the role of the computers 12 as a requestor of data or services, while the term "server" is understood to refer to the role of the servers 14 to provide such data or services. Additionally, it is possible that a computer 12 may request data or services in one transaction and provide data or services in a different transaction, thus changing its role from client to server or vice versa. It is further understood that the term "server" as utilized herein may also refer generally to networked services such as a Secure Sockets Layer/Transport Layer Security (SSL/TLS) Virtual Private Network (VPN), through which conventional servers 14 provide data and applications to remote clients.

The computers 12, 14 are connected to a wide area network such as the Internet 22 via network connections 24. Requests from the client computers 12 and requested data from the server computers 14 are delivered through the network connections 24. According to an embodiment of the present invention, the server computers 14 are web servers, and the client computers 12 include web browsing applications such as Microsoft Internet Explorer that visually render documents provided by the server computers 14 on the display units 18. It will be appreciated that the network topology shown in FIG. 1 is presented by way of example only and not of limitation, and any other type of local and/or wide area network may be readily substituted without departing from the scope of the present disclosure. It is understood that any well-known data transmission protocol may be utilized for the network connections 24 and the Internet 22.

Each server 14 may be similar to the identity provider 214 in FIGS. 2 and 3 (described below), or it may be the server that performs the alert evaluation 412 or security policy enforcement 414 in FIG. 4, or is managed by the security policy 512 in FIG. 5. Server 14 may deploy software capable of receiving security alerts and receiving requests from a user identity to access a secure resource. Server 14 may deploy software capable of consuming the security alert, evaluating the security alert to determine a security action based on a security protocol, and either providing the user identity access to a secure resource or containing the user identity.

In one embodiment of the present invention, each server 14 is a web server, an online enterprise, or a hosting service. The server 14 may execute an alert evaluation and policy enforcement component. This alert evaluation and policy enforcement component may take security alerts from a third-party feed in order to determine whether to grant a user access to a secure resource, or whether to contain or quarantine the user.

In some embodiments, the alert evaluation and policy enforcement component is a plug-in software component, such as a web plug-in, installed on the server 14. Another aspect of the present invention contemplates the server component being downloadable onto the server 14 via the network connection 24. The alert evaluation and policy enforcement functionality may alternatively be implemented in a stand-alone device interfacing with the server 14.

II. Example Identity Security and Containment Environment

Figure 2:
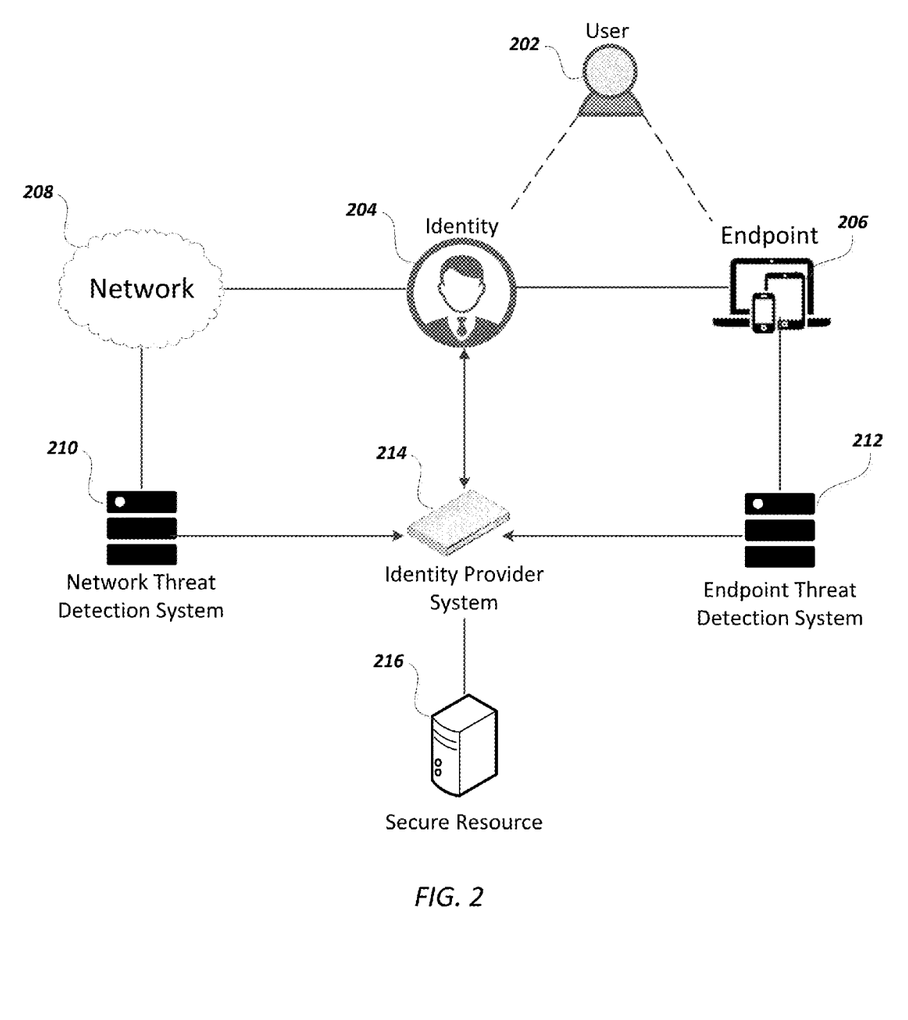
FIG. 2 is a block diagram illustrating an example identity security and containment environment, according to one embodiment of the present disclosure.

FIG. 2 is a block diagram illustrating an example identity security and containment environment, according to an embodiment of the present disclosure.

A User 202 may be interested in accessing Secure Resource 216. Secure Resource 216 may be a local, enterprise, or cloud resource (for example, any web, network, mobile, or cloud resource). Secure Resource 216 may be an application, website, or datastore. Secure Resource 216 may have data that User 202 desires to access, or Secure Resource 216 may play a role in providing a service that User 202 desires to utilize.

User 202 may access an Endpoint Device 206. Endpoint Device 206 is any electronic device capable of accessing Secure Resource 216. Endpoint Device 206 may be a desktop computer, a mobile phone, a tablet, a notebook computer, and so forth. User may direct Endpoint Device 206 to attempt to access Secure Resource 216, such as by entering a Uniform Resource Locator (URL) into a browser on Endpoint Device 206, or by opening a software application installed on Endpoint Device 206 that is configured to access Secure Resource 216.

User 202 may be associated with a user identity such as Identity 204. Identity 204 may be a user account, and the user account may be configured by User 202. The user account may be tied to characteristics or attributes associated with User 202. The User 202 may use Endpoint Device 206 with an associated user identity, such as Identity 204. Identity 204 may be used to log-in or access the Endpoint Device 206 itself. Identity 204 may also be used to log-in or access Secure Resource 216. The Endpoint Device 206 may provide Identity 204 to the Secure Resource 216 during a security check or identity validation process.

Endpoint Device 206 may be monitored by Endpoint Threat Detection 212. Endpoint Threat Detection 212 may be one or more computing devices and/or software applications. Endpoint Threat Detection 212 may detect security vulnerabilities (such as phishing, malware, social engineering) on Endpoint Device 206. Endpoint Threat Detection 212 may detect in real-time when Endpoint Device 206 has been comprised, by monitoring for signs or indicators of threat actor activity and investigating threat events for severity, accuracy, and context. Endpoint Threat Detection 212 may detect when Identity 204 has been compromised. Endpoint Threat Detection 212 may be able to issue alerts in real-time to Identity Provider 214 if either Endpoint Device 206 or Identity 204 has been comprised. The alert may describe the nature of the compromise and the associated Identity 204 that has been compromised.

Identity 204 may be used on a network, such as Network 208. Network 208 may be the internet, or it may be an enterprise or local network. Network 208 may be monitored by Network Threat Detection 210. Network Threat Detection 210 may be one or more computing devices and/or software applications. Network Threat Detection 210 may perform similar roles as Endpoint Threat Detection 212, and it may be capable of determining when Identity 204 has been compromised. Network Threat Detection 210 may be able to issue alerts in real-time to Identity Provider 214 if either Network 208 or Identity 204 has been comprised. The alert may describe the nature of the compromise and the associated Identity 204 that has been compromised.

Identity Provider 214 is capable of receiving and consuming alerts from Network Threat Detection 210 and Endpoint Threat Detection 212 in real-time. When User 202, or another person, attempts to access Secure Resource 216 using Identity 204, then Identity Provider 214 may consume a security event or alert from a third-party threat detection product and then control access for the Identity 204 (which may be an user account). The Identity Provider 214 may control access for Identity 204 according to a level of risk associated with the security event or alert. For example, Identity Provider 214 may lock out Identity 204 completely for some security events. For other security events, Identity Provider 214 may step up the level of security for Identity 204, such as by requesting additional authentication factors or credentials. If the User 202 then provides the additional factors associated with Identity 204, or there were no security alerts associated with Identity 204, then Identity Provider 214 may provide access to Secure Resource 216 for Identity 204. The Identity Provider 214 may issue a token or certificate that grants access to Secure Resource 216, such as providing a Single Sign-On (SSO) token.

III. Example Identity Provider Placement

Figure 3A:
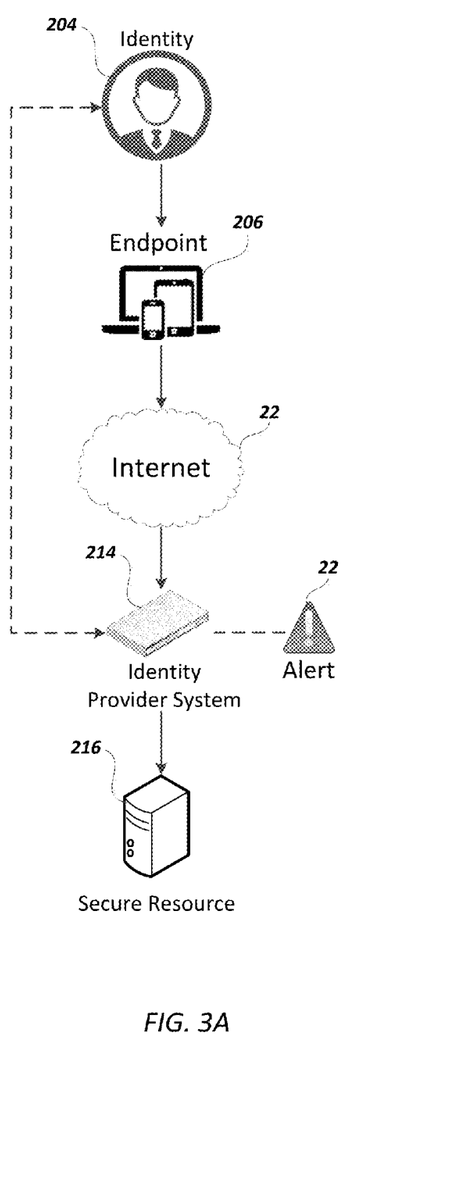
FIG. 3A is a flowchart illustrating how an identity provider may control access to a secure resource for a user identity.
Figure 3B:
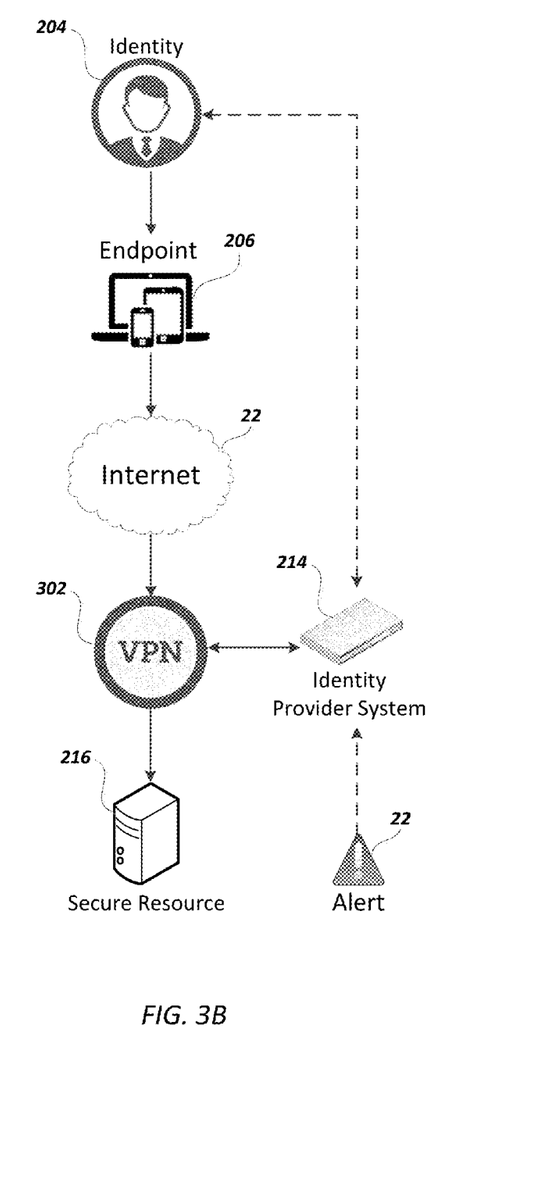
FIG. 3B is a flowchart illustrating how an identity provider may control access to a secure resource for a user identity.

FIGS. 3A and 3B are flowcharts illustrating how an identity provider may control access to a secure resource for a user identity.

With reference to FIG. 3A, an Identity 204 (such as a user account) may be used to try and access a Secure Resource 216. Identity 204 may be used on an Endpoint Device 206, which may be any electronic device capable of accessing Secure Resource 216 (such as a computer, mobile phone, tablet, or notebook).

Endpoint Device 206 may attempt to connect to the Secure Resource 216 through Internet 22. However, in some embodiments, Endpoint Device 206 may not need to go on the Internet 22 in order to access Secure Resource 216. For example, Secure Resource 216 may be on the same local area network as Endpoint Device 206. Endpoint Device 206 may attempt to connect to the Secure Resource 216 through that network.

However, before access to Secure Resource 216 is granted to Endpoint Device 206 and Identity 204, an Identity Provider 214 may perform a security check on Identity 204. Identity Provider 214 may consume an Alert 22 associated with Identity 204. Alert 22 may be a security alert that helps Identity Provider 214 to determine the risk associated with Identity 204.

Based on a pre-defined security policy, Identity Provider 214 may perform different actions depending on the level of risk associated with the alert and Identity 204. For a high degree of risk, such as a major security risk with a high fidelity event or alert, the security policy may dictate that the user account or identity have their account contained by denying access to Secure Resource 216 completely. The security policy may also dictate that the level of security for the user account authentication be increased based on the level of risk present. For example, at the lowest level of risk the Identity Provider 214 may provide access to Secure Resource 216 by requiring a username and a password. At higher levels of risk, Identity Provider 214 may provide access to Secure Resource 216 by requiring additional authentication factors associated with User Identity 204, in addition to a username and a password. Some non-limiting examples of additional authentication factors include a one-time password (OTP) or a biometric.

With reference to FIG. 3B, the process for Identity 204 accessing Secure Resource 216 is similar with a notable difference: connection to the Secure Resource 216 is done through a Virtual Private Network (VPN), VPN 302. The Identity 204 is utilized on Endpoint Device 206, which is capable of connecting to Internet 22 and connecting to VPN 302. The Endpoint Device 206 connects to VPN 302, and Identity 204 is used to attempt to log-in to VPN 302.

The Identity Provider 214 is configured to work with the VPN 302. Identity Provider 214 looks up Identity 204 and consumes any alerts associated with the identity, such as Alert 22. Alert 22 may be provided by a third-party threat detection service, application, or device. Identity Provider 214 may evaluate Alert 22 to determine a risk-level associated with Alert 22, and if there is a security risk involved then the Identity Provider 214 may contain Identity 204 based on a pre-defined security policy. Identity 204 may be denied access to VPN 302 outright, or the appropriate stepped-up workflow may be presented to any user or entity using the contained Identity 204. In order to break containment, additional authentication factors associated with Identity 204 may need to be furnished to Identity Provider 214.

IV. Consuming Alerts

Figure 4:
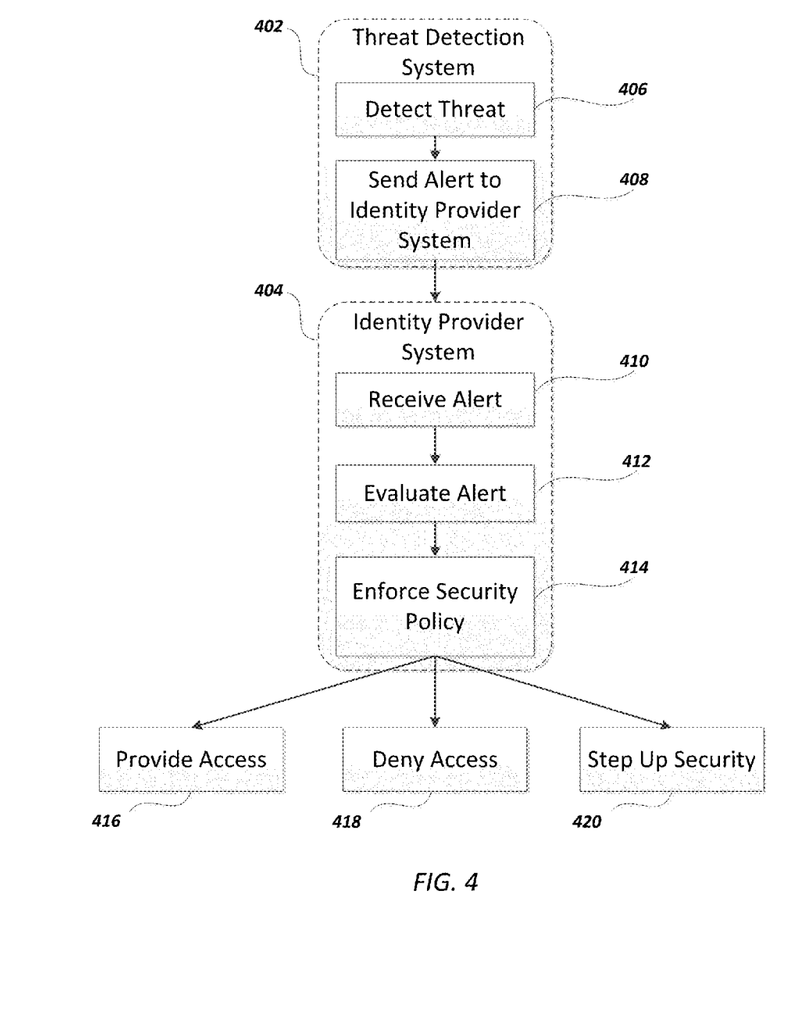
FIG. 4 is a flowchart illustrating how an identity provider may consume alerts to enforce a security policy, according to one embodiment of the present disclosure.

FIG. 4 is a flowchart illustrating how an identity provider may consume alerts to enforce a security policy, according to one embodiment of the present disclosure.

Threat Detection 402 may be a device, application, or service configured to detect or protect against web/security threats at an Internet gateway, in the cloud, across network servers, and/or on an endpoint device or client. Threat Detection 402 may provide multi-layered detection of threats across multiple components of a network. Threat Detection 402 may also be one or more threat detection devices, applications, and/or services.

At Block 406, Threat Detection 402 may detect a threat associated with a user identity. For example, Threat Detection 402 may detect that a desktop computer logged-in under the user identity has been infected with malware. As another example, Threat Detection 402 may detect that the user identity has been the target of phishing emails. Threat Detection 402 may detect whether the user of the user identity clicked on the phishing link and the user identity has been compromised.

At Block 408, Threat Detection 402 may send an alert to Identity Provider 404. The alert may disclose any security events or indications that a user identity has been compromised. Thus, the alert may be linked to a user identity.

At Block 410, Identity Provider 404 receives the alert from Threat Detection 402.

At Block 412, Identity Provider 404 evaluates the alert to determine a level of risk associated with the alert and the user identity.

At Block 414, Identity Provider 404 may enforce a pre-defined security policy based on the evaluation of the alert. Identity Provider 404 may then provide access to the secure resource for the user identity at Block 416. Alternatively, Identity Provider 404 may deny access to the secure resource for the user identity at Block 418. Alternatively, Identity Provider 404 may step up the security in the authentication of the user identity at Block 420. More authentication factors associated with the user identity may be required before Identity Provider 404 grants access to the secure resource.

Figure 5:
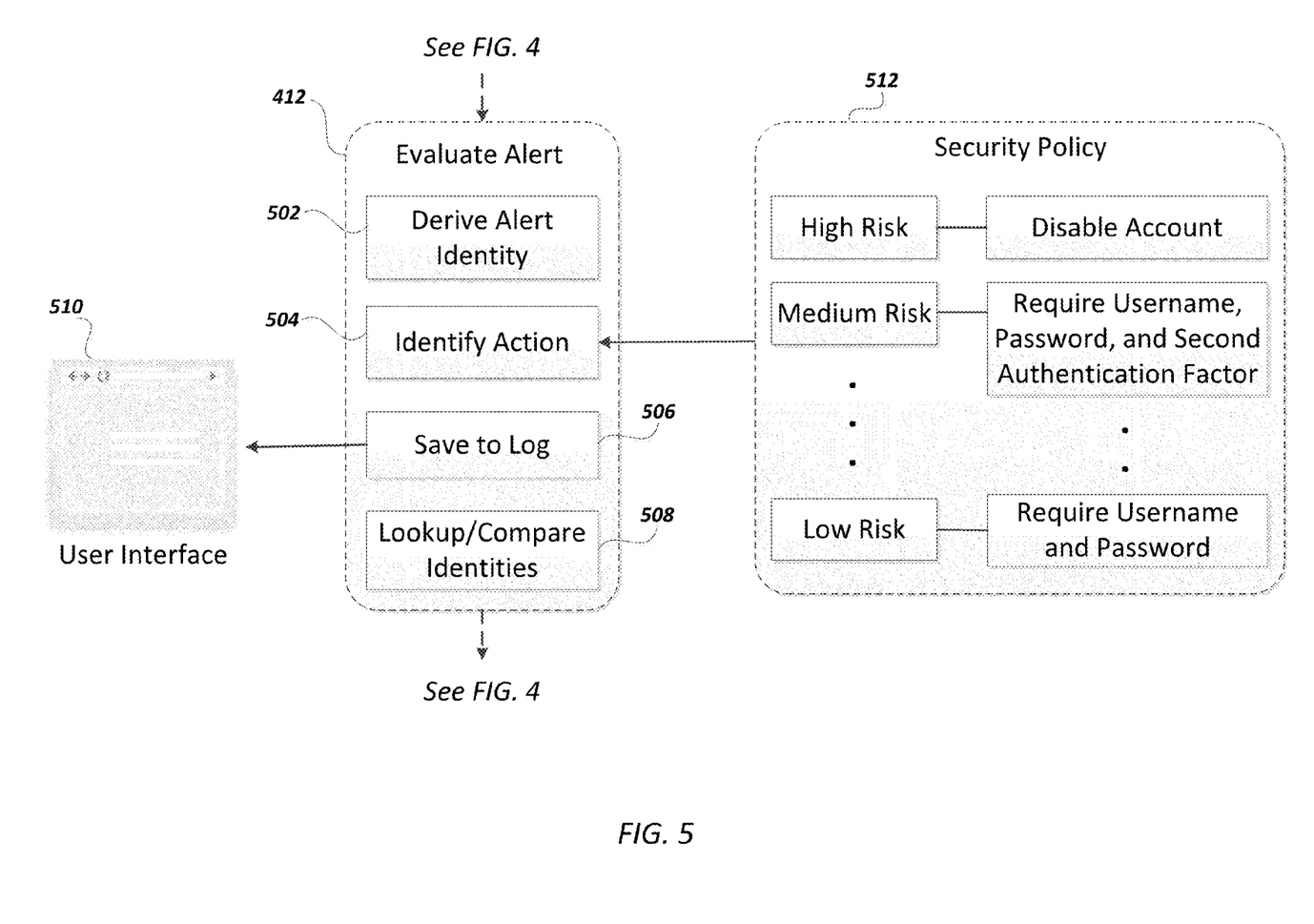
FIG. 5 is a flowchart illustrating how alerts may be evaluated, according to one embodiment of the present disclosure.

FIG. 5 is a flowchart illustrating how alerts may be evaluated, according to one embodiment of the present disclosure.

At Block 412, an Identity Provider like the one shown in FIG. 4 may evaluate the alert it has received in order to determine how to enforce a security policy against the user identity associated with the alert. The Identity Provider may perform various sub-blocks in order to evaluate the alert, such as Block 502, 504, 506, and 508. In this figure, Blocks 502, 504, 506, and 508 may be performed in any order and not just in the top-down order presented. For example, the Identity Provider may save the alert to a log at Block 506 before identifying the significance of the alert at Block 504. Alternatively, the Identity Provider may first identify the significance of the alert at Block 504 before saving the alert to a log at Block 506.

At Block 502, the Identity Provider may derive a user identity from the alert to obtain an alert identity. An alert issued from a threat detector may be in association with a user identity, such as a user account (i.e., "jsmith"). The alert may inform the Identity Provider that "jsmith" has possibly been compromised due to a security breach or event, such as a user on the account inadvertently clicking a known phishing link. In this example, the Identity Provider would process the alert in order to identity "jsmith" as the alert identity.

At Block 508, the Identity Provider receives a user identity furnished by a user seeking to access a secure resource. The user identity may be provided manually by the user, such as by entering a user account name into a text field, or the user identity may be automatically provided by an endpoint device used by the user, such as through a credential or certificate. The Identity Provider then looks up the received user identity in all of the alerts, by matching the received user identity against the derived alert identity associated with each alert. This may be a simple process if the received user identity is in the same format and structure as the derived alert identities. For example, if the Identity Provider receives a user identity "jsmith" from the user, the Identity Provider may attempt to match "jsmith" with any alerts that have the derived alert identity of "jsmith." The Identity Provider may also be configured to perform fuzzy matching between the received user identity and any similar alert identities in the alerts. This may account for the received identities and the alert identities having different formats or structures. For example, the Identity Provider may receive a received user identity of "John Smith" because the user provider their full name. However, the alert identity associated with the same user identity may be "jsmith." The Identity Provider may be configured to make imperfect matches between the received user identity and any alert identities by making best-case estimates or guesses.

At Block 504, the Identity Provider identifies what action to take on the alert. There may be a pre-defined Security Policy 512 that specifies and instructs the Identity Provider on what action to take. In the figure, Security Policy 512 may specify that for a user identity that has an alert corresponding to a high security risk, the user account may be disabled. Security Policy 512 may specify that for medium security risks, the Identity Provider may request a username, password, and an additional authentication factor. Security Policy 512 may specify that for low security risks, the Identity Provider may request just a username and a password. The Security Policy 512 may also define what level of security risk each type of alert is, or Security Policy 512 may also define a method for the Identity Provider to calculate a risk score for each alert, or Security Policy 512 may also allow Identity Provider to classify each individual alert into an appropriate category of security risk such as based on a calculated risk score.

At Block 506, the alert and the alert identity (the associated user identity) may be stored in a log, database, or datastore. This data may be accessible through an interactive user interface, such as User Interface 510. User Interface 510 may be able to view all the alerts that the Identity Provider receives. User Interface 510 may be able to filter alerts to be viewed based on a time frame, so that a user may view alerts that have just been received. An example of how User Interface 510 may look is shown in FIG. 6.

V. User Interface for Viewing Alerts (FIG. 6)

Figure 6:
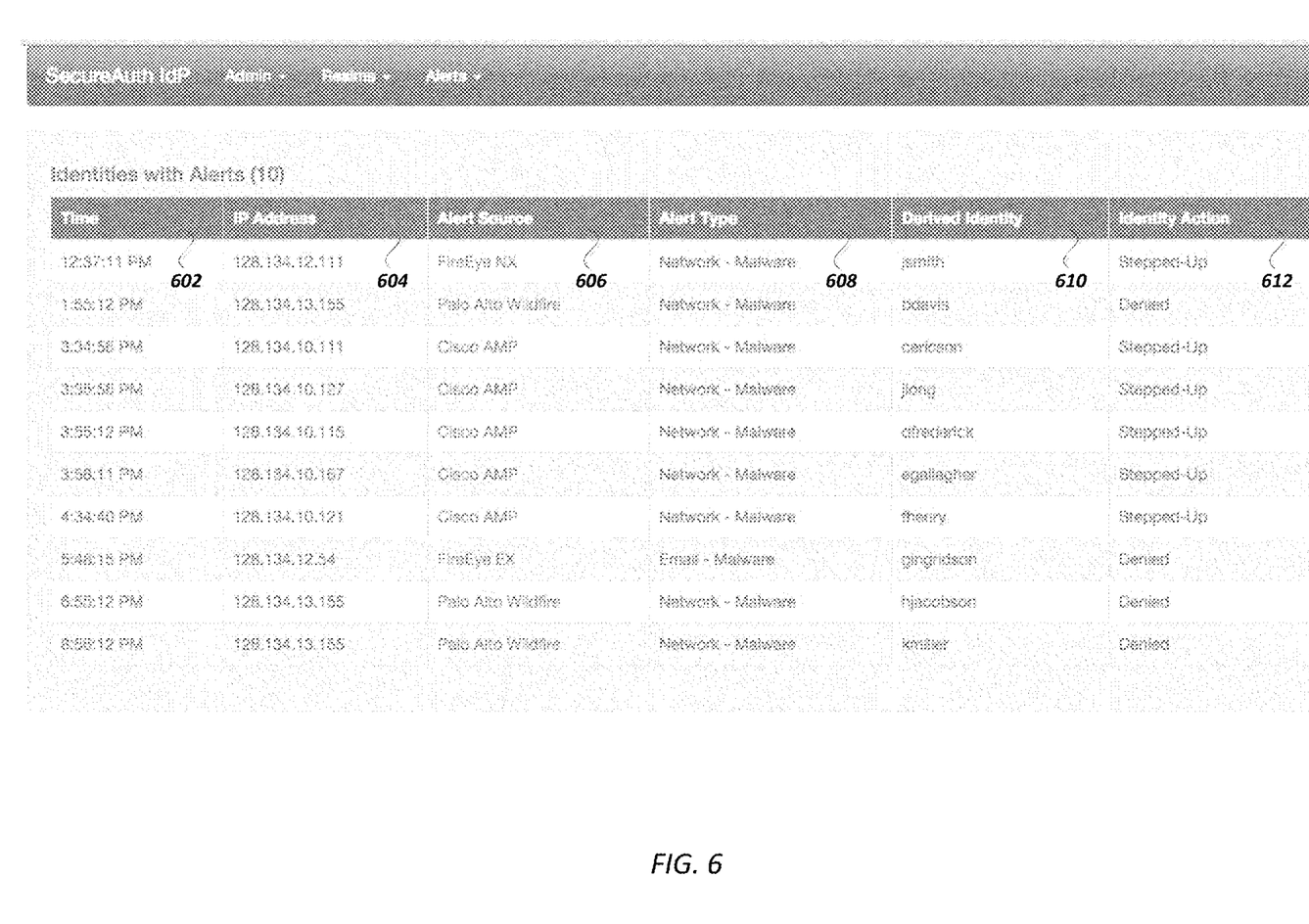
FIG. 6 illustrates an example interactive user interface for viewing alerts, according to one embodiment of the present disclosure.

FIG. 6 illustrates an example interactive user interface for viewing alerts, according to one embodiment of the present disclosure.

In this figure, ten example alerts are shown with their corresponding user identities (the derived alert identities) in a tabular format. Each row represents a single alert, with each column representing an attribute or property associated with the alert. There is a Time Column 602, a IP Address Column 604, an Alert Source Column 606, an Alert Type Column 608, a Derived Identity Column 610, and an Identity Action Column 612.

The Time Column 602 may show the time that the alert was received. In some embodiments, Time Column 602 may show the time that each alert was issued or generated. In some embodiments, Time Column 602 may show the specific day or date associated with each alert. This may allow a user to view historical alerts, rather than more-recent or real-time alerts, which the Identity Provider may be configured to utilize in order to contain identities.

The IP Address Column 604 may show an IP Address associated with the alert. For example, a user may use an identity with an endpoint device, and the endpoint device may be connected to a network with an IP Address. IP Address Column 604 would show the IP Address of that connection. In FIG. 6, the IP Address Column 604 shows IP Addresses, all with the similar IP of "128.134.X.X" which signifies that all the alerts shown are associated with devices on the same local area network.

The Alert Source Column 606 may show the source of the issued alert, such as from a third-party threat detection device, service, application, or provider. In the examples shown, the alert sources include FireEye NX, Palo Alto Wildfire, and Cisco AMP. Other threat detection or threat protection services may be used as alert sources. The specific alert source may be factored into a security policy or method of classifying an alert into an appropriate risk level, for determining the appropriate action to take with a user identity associated with the alert.

The Alert Type Column 608 may show the type of alert that was issued by the alert source. The type of alert may provide information on how, or why, the alert was generated and issued. For example, the figure has the alert types: "Network—Malware" and "Email—Malware." The "Network—Malware" alert type may signify that the alert was generated as a result of the user identity being compromised by malware while accessing a network. The "Email—Malware" alert type may signify that the alert was generated as a result of identifying malware being sent to the user identity through email.

The Derived Identity Column 610 may show the derived user identity associated with each alert (the alert identity). For example, the figure shows ten alerts associated with ten different identities: "jsmith", "bdavis", "cericson", "jlong", "dfrederick", "egallagher", "fhenry", "gingridson", "hjacobson", and "kmiller."

The Identity Action Column 612, may be the action dictated according to a security policy, such as Security Policy 512 shown in FIG. 5. For example, the figure shows the actions of "Stepped-Up" and "Denied." The "Stepped-Up" identity action may represent that the identity provider should request additional security factors from a user identity corresponding to the derived identity. So based on the first alert shown, if a user using the "jsmith" identity attempts to access the secure resource that is secured by the identity provider, the identity provider will request additional security factors before that user is provided access to the secure resource. The "Denied" identity action may represent that the identity provider should deny access to any user identity corresponding to the derived identity. So based on the second alert shown, if a user using the "bdavis" identity attempts to access the secure resource, the identity provider will deny access to the user completely.

In the user interface shown, an investigator tasked with investigating the alerts may drill down into a specific user identity to see all of the login activity associated with that activity. For example, the user identity entries in the Derived Identity Column 610 may be links that can be clicked on in order to see login activity associated with that particular identity. If the investigator clicks on "jsmith", login activity for "jsmith" may be displayed. The login activity may be displayed in a table format, which includes columns such as login time, source IP address, the application the user is trying to access, the login event type, and whether or not that event was successful or not. Examples of login event types may include a password challenge, a one-time password challenge, a username challenge, or any commonly accepted method of login and authentication.

The investigator may also be able to drill down into a specific source IP address to see all of the login activity associated with that IP address. For example, the IP addresses in IP Address Column 604 may be links that can be clicked on in order to see login activity associated with that particular IP Address. If the investigator clicks on "128.134.12.111", then login activity associated with that IP address may be displayed. The login activity may be displayed in a table format, which includes columns such as login time, username, the application the user is trying to access, the login event type, and whether or not that event was successful or not. As a more specific example, clicking "128.134.12.111" may reveal that IP address was used to attempt to login under both "jsmith" and "bdavis".

Implementation & Additional Aspects

Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry. The disclosed processes may be performed under control of software executed by one or more computing devices, each of which may include a processor and memory.

Thus, while the foregoing is directed to various embodiments, other and further embodiments may be devised without departing from the basic scope thereof. For example, aspects of the present disclosure may be implemented in hardware or software or in a combination of hardware and software. An embodiment of the disclosure may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored. Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

What is claimed is:

1. A computing appliance for consuming security alerts from an alert source, the computing appliance comprising:
   one or more processors;
   a computer-readable memory; and
   an authentication program comprising executable instructions stored in the computer-readable memory, wherein the executable instructions direct the one or more processors to at least:
      receive, over a computer network, a security alert generated by a threat detection system in response to detecting that a user device logged in with a first user account has been compromised with malware, wherein the security alert is associated with a security threat;
      determine that the first user account is used to log in to the user device when the user device is compromised with the malware using the security alert;
      determine a security action to be executed by the one or more processors for controlling access to a secure computer-based resource that requires authentication of a user identity, the security action executed when the first user account is used in an attempt to access the secure computer-based resource, wherein the security action is determined based on the security alert and a security protocol;
      receive, over the computer network, a request to access the secure computer-based resource, wherein the request comprises an identification of a second user account;
      determine that the first user account matches the second user account; and
      execute the determined security action in response to determining that the first user account and the second user account match.

2. The computing appliance of claim 1, wherein the executable instructions further direct the one or more processors to at least classify the security alert into an action category defined in the security protocol, and wherein the security protocol comprises at least two action categories.

3. The computing appliance of claim 2, wherein the at least two action categories in the security protocol comprise:
   a deny access category for which the security action comprises denying the first user account access to the secure computer-based resource; and
   a step-up security category for which the security action comprises requesting at least one additional security factor from the first user account.

4. The computing appliance of claim 3, wherein the at least one additional security factor comprises at least one of: a username, a password, a one-time password, or a biometric.

5. The computing appliance of claim 1, wherein the executable instructions further direct the one or more processors to at least provide a third user account with access to the secure computer-based resource if the third user account does not match the first user account.

6. The computing appliance of claim 1, wherein the threat detection system comprises one of a network threat detection system or an endpoint threat detection system.

7. A computerized method for providing a derived credential to a target device, the method comprising:
by one or more hardware processors executing computing instructions:
receiving, over a computer network, a security alert generated by a threat detection system in response to detecting that a user device logged in with a first user account has been compromised with malware, wherein the security alert is associated with a security threat;
determining that the first user account is used to log in to the user device when the user device is compromised with the malware using the security alert;
determining a security action to be executed by the one or more hardware processors for controlling access to a secure computer-based resource that requires authentication of a user identity, the security action executed when the first user account is used in an attempt to access the secure computer-based resource, wherein the security action is determined based on the security alert and a security protocol;
receiving, over the computer network, a request to access the secure computer-based resource, wherein the request comprises an identification of a second user account;
determining that the first user account matches the second user account; and
executing the determined security action in response to determining that the first user account and the second user account match.

8. The computerized method of claim 7, wherein determining a security action further comprises classifying the security alert into an action category defined in the security protocol, and wherein the security protocol comprises at least two action categories.

9. The computerized method of claim 8, wherein the at least two action categories in the security protocol comprise:
a deny access category for which the security action comprises denying the first user account access to the secure computer-based resource; and
a step-up security category for which the security action comprises requesting at least one additional security factor from the first user account.

10. The computerized method of claim 8, wherein the at least two action categories in the security protocol comprise:
an allow access category for which the security action comprises providing the first user account access to the secure computer-based resource.

11. The computerized method of claim 9, wherein the at least one additional security factor comprises at least one of: a username, a password, a one-time password, or a biometric.

12. The computerized method of claim 7, further comprising providing a third user account with access to the secure computer-based resource if the third user account does not match the first user account.

13. The computerized method of claim 7, wherein the threat detection system comprises one of a network threat detection system or an endpoint threat detection system.

14. A computerized method for issuing and consuming a security alert, the method comprising:
by one or more hardware processors executing computing instructions:
generating a security alert in response to detecting that a user device logged in with a first user account has been compromised with malware, the security alert associated with a security threat;
sending the security alert over a computer network;
receiving the security alert over the computer network;
determining that the first user account is used to log in to the user device when the user device is compromised with the malware using the security alert;
determining a security action to be executed by the one or more hardware processors for controlling access to a secure computer-based resource that requires authentication of a user identity, the security action executed when the first user account is used in an attempt to access the secure computer-based resource, wherein the security action is determined based on the security alert and a security protocol;
receiving, over the computer network, a request to access the secure computer-based resource, wherein the request comprises an identification of a second user account;
determining that the first user account matches the second user account; and
executing the determined security action in response to determining that the first user account and the second user account match.

15. The computerized method of claim 14, further comprising detecting the security threat by monitoring malware on the user device, and wherein the user device comprises one of a computing device, a smart phone, a tablet, or a notebook computer.

16. The computerized method of claim 14, wherein determining a security action further comprises classifying the security alert into an action category defined in the security protocol, and wherein the security protocol comprises at least two action categories.

17. The computerized method of claim 16, wherein the at least two action categories in the security protocol comprise:
a deny access category for which the security action comprises denying the first user account access to the secure computer-based resource; and
a step-up security category for which the security action comprises requesting at least one additional security factor from the first user account.

18. The computerized method of claim 16, wherein the at least two action categories in the security protocol comprise:
an allow access category for which the security action comprises providing the first user account access to the security computer-based resource.

19. The computerized method of claim 17, wherein the at least one additional security factor comprises at least one of: a username, a password, a one-time password, or a biometric.

20. The computerized method of claim 14, further comprising providing a third user account with access to the secure computer-based resource if the third user account does not match the first user account.

* * * * *